United States Patent [19]
Griffis

[11] Patent Number: 4,826,514
[45] Date of Patent: May 2, 1989

[54] APPARATUS FOR DAMPENING HAZARDOUS MATERIAL

[76] Inventor: Steven C. Griffis, 2929 Avenue D, Council Bluffs, Iowa 51501

[21] Appl. No.: 65,729

[22] Filed: Jun. 23, 1987

[51] Int. Cl.$^4$ ............................................. B01D 47/06
[52] U.S. Cl. ................................. 55/257.1; 55/259; 55/429; 55/439; 55/468
[58] Field of Search ............. 55/220, 240, 248, 257 R, 55/259, 429, 437–439, 468; 472/DIG. 3

[56] References Cited

U.S. PATENT DOCUMENTS

| | | | |
|---|---|---|---|
| 1,157,131 | 10/1915 | Sutton | 55/429 X |
| 1,243,472 | 10/1917 | Wilson | 55/259 X |
| 2,051,924 | 8/1936 | Watzke | 55/439 X |
| 2,511,118 | 6/1950 | Matheson | 55/438 X |
| 2,789,659 | 4/1957 | Hemscheidt | 55/323 |
| 3,490,208 | 1/1970 | Meyer et al. | 55/429 X |
| 3,906,733 | 9/1975 | Koppers | 55/220 X |
| 4,298,367 | 11/1981 | Descolas | 55/240 X |
| 4,320,555 | 3/1982 | Watson | 55/220 X |
| 4,604,111 | 8/1986 | Natale | 55/97 |
| 4,640,697 | 2/1987 | Erickson, Jr. | 55/248 |

FOREIGN PATENT DOCUMENTS

| | | | |
|---|---|---|---|
| 137699 | 4/1985 | European Pat. Off. | 55/220 |
| 1170885 | 5/1964 | Fed. Rep. of Germany | 55/468 |
| 2615180 | 10/1977 | Fed. Rep. of Germany | 55/259 |
| 648201 | 2/1979 | U.S.S.R. | 55/468 |

OTHER PUBLICATIONS

Nilfisk Simplifies the Safe Collection & Disposal of Toxic, Hazardous, and Nuisance Waste Materials, A Six-Page Brochure from Nilfisk of America, Inc.
Technical Report R883, Civil Engineering Laboratory, Naval Construction Battalion Center, 2/1981, pp. 7-1 through 7-15.
EPA-600/2-80-088, 5/1980, Evaluation of a Commercial Vacuum System for the Removal of Asbestos, pp. 1-74.
EPA-450/2-78-014, 3/1978, Asbestos Containing Material in School Buildings, A Guidance Document, Part 2, pp. I-1-1 through K-1.
Nilfisk GS82, A Two-Page Brochure from Nilfisk of America, Inc.

Primary Examiner—Robert Spitzer
Attorney, Agent, or Firm—Zarley, McKee, Thomte, Voorhees & Sease

[57] ABSTRACT

An apparatus is described for dampening hazardous material. A collector pan is positioned at the end of an elongated conduit with a spray nozzle being positioned within the collector pan. The spray nozzle is in communication with a source of water under pressure or a suitable encapsulating fluid. The elongated conduit is in communication with a cylindrical trap which in turn is in communication with a conventional filtration unit. When the filtration unit is actuated, air is drawn through the collector pan, through the elongated conduit, through the cylindrical trap and into the filtration unit. Actuation of the spray nozzle will cause the fluid to be sprayed onto the material to be removed, compressed or encapsulated with any asbestos material being dislodged during the spraying operation being collected in the collector pan and delivered to the cylindrical trap.

2 Claims, 2 Drawing Sheets

APPARATUS FOR DAMPENING HAZARDOUS MATERIAL

BACKGROUND OF THE INVENTION

In the early 1940's, asbestos was an inexpensive material which was used in virtually every industrial plant across the nation because of its superior capabilities of noise reduction, insulating and fire retardant qualities. Asbestos was used in cement asbestos pipe, plaster, wiring, pipe insulation, sound absorbing tiles, floor tiles and sprayed on ceiling structural steel and deck pans.

Asbestos has been found to be a health hazard and asbestos removal or abatement programs are being conducted to remove these health hazards. Many regulations have been adopted and are in place to ensure the safety of those workers who are removing the asbestos as well as to ensure that the asbestos being removed will not be introduced into the surrounding atmosphere. For example, U.S. Pat. No. 4,604,111 describes a fairly common system which is employed in an asbestos removal project. In most projects, an enclosure is created around the space in which the asbestos is to be removed. The space is sealed by means of plastic sheets or the like. An air inlet is provided for the enclosed space to permit air to be drawn thereinto. A filtration unit such as the Model MT-3 of Micro-Trap, Inc. of Maple Shade, N.J. or the Model ST2000 of Global Consumer Services, Inc. of Los Angeles, Calif. is employed with each of the units having an air inlet and an air outlet. The air outlet of the filtration unit is placed in communication with the area outside of the enclosed space. A blower means is provided in the filtration unit so that the contaminated air in the enclosed space will be drawn through the filtration unit with the asbestos fibers being collected in the filtration unit. The filtration units are sometimes referred to as negative air systems so that air is drawn through the air inlet formed in the wall means and through the filtration unit.

When the asbestos material is being removed from a large area, it is frequently necessary to erect temporary walls to enclose a smaller space in which the asbestos will be removed. Normally, the upper end of the temporary wall must be wedged into contact with a beam, deck or the like so that the upper end of the temporary wall will sealably engage the same. To provide such engagement, it is normally necessary to chip or scrap-away the asbestos material immediately above the upper end of the temporary wall so that the upper end of the wall may be placed into engagement with an asbestos-free surface. The chipping or scraping of the asbestos material creates a health hazard in that asbestos fibers become airborne during the removal of the same.

In an attempt to avoid such a problem, the asbestos material is sometimes sprayed with a liquid material to soften the material prior to it being removed to facilitate the installation of the temporary wall. However, the mere spraying of the liquid material onto the asbestos dislodges a certain amount of the asbestos thereby creating a health hazard.

In other types of asbestos abatement programs, the asbestos is sometimes encapsulated with a suitable liquid material which subsequently dries. However, the spraying of the encapsulating liquid onto the asbestos material does dislodge asbestos fibers thereby creating a health hazard.

It is therefore a principal object of the invention to provide an apparatus for dampening hazardous material during the removal thereof.

A further object of the invention is to provide an apparatus for dampening hazardous material prior to the removal thereof.

Yet another object of the invention is to provide an apparatus which may be used to encapsulate hazardous material.

Still another object of the invention is to provide a system for use in asbestos removal projects wherein a movable collector pan is positioned adjacent the area in which the asbestos is being removed with a spray nozzle being positioned adjacent the collector pan so that water or the like may be sprayed onto the hazardous material to dampen the same with the collector pan collecting the excess water and asbestos fibers which are dislodged during the spraying operation.

These and other objects will be apparent to those skilled in the art.

SUMMARY OF THE INVENTION

An apparatus is described for dampening hazardous material to facilitate the installation of temporary walls which will enclose space in which the material will be removed. The apparatus may also be used to encapsulate the hazardous material. The area in which the asbestos is to be removed is first enclosed by either using the existing walls of the structure or by creating temporary walls. When a temporary wall is utilized, the asbestos material above the upper end of the temporary wall must be manually removed to permit the upper end of the temporary wall to be placed in engagement with a beam, deck, etc. In some cases, the asbestos material is sprayed with water to dampen the same. When the asbestos material is dampened, it becomes somewhat soft to enable the upper end of the temporary wall to compress the asbestos material. In either situation, asbestos fibers become airborne which creates a health hazard. In this invention, a collector pan is positioned below the area which will be engaged by the upper end of the temporary wall. A spray nozzle is positioned adjacent the collector pan and is connected to a source of water for spraying water or encapsulating material onto the asbestos material. A conduit extends from the collector pan to a trap which is in communication with an air filtration unit.

In use, asbestos fibers which are dislodged during the removal or spraying will be collected within the collector pan, as will the excess water, and will be delivered to the trap with a large portion of the asbestos fibers remaining in the trap. The air passes from the trap to the filtration unit for filtering the air and for discharge outwardly of the enclosed space.

DESCRIPTION OF THE PREFERRED EMBODIMENT

Figure 1:
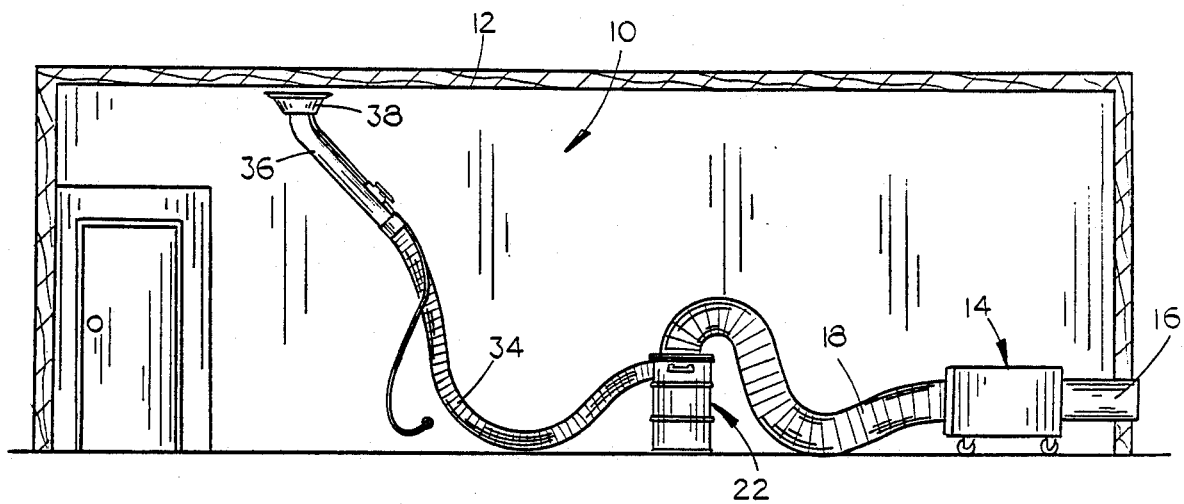
FIG. 1 is a side view illustrating the apparatus of this invention being used to dampen hazardous material.
Figure 2:
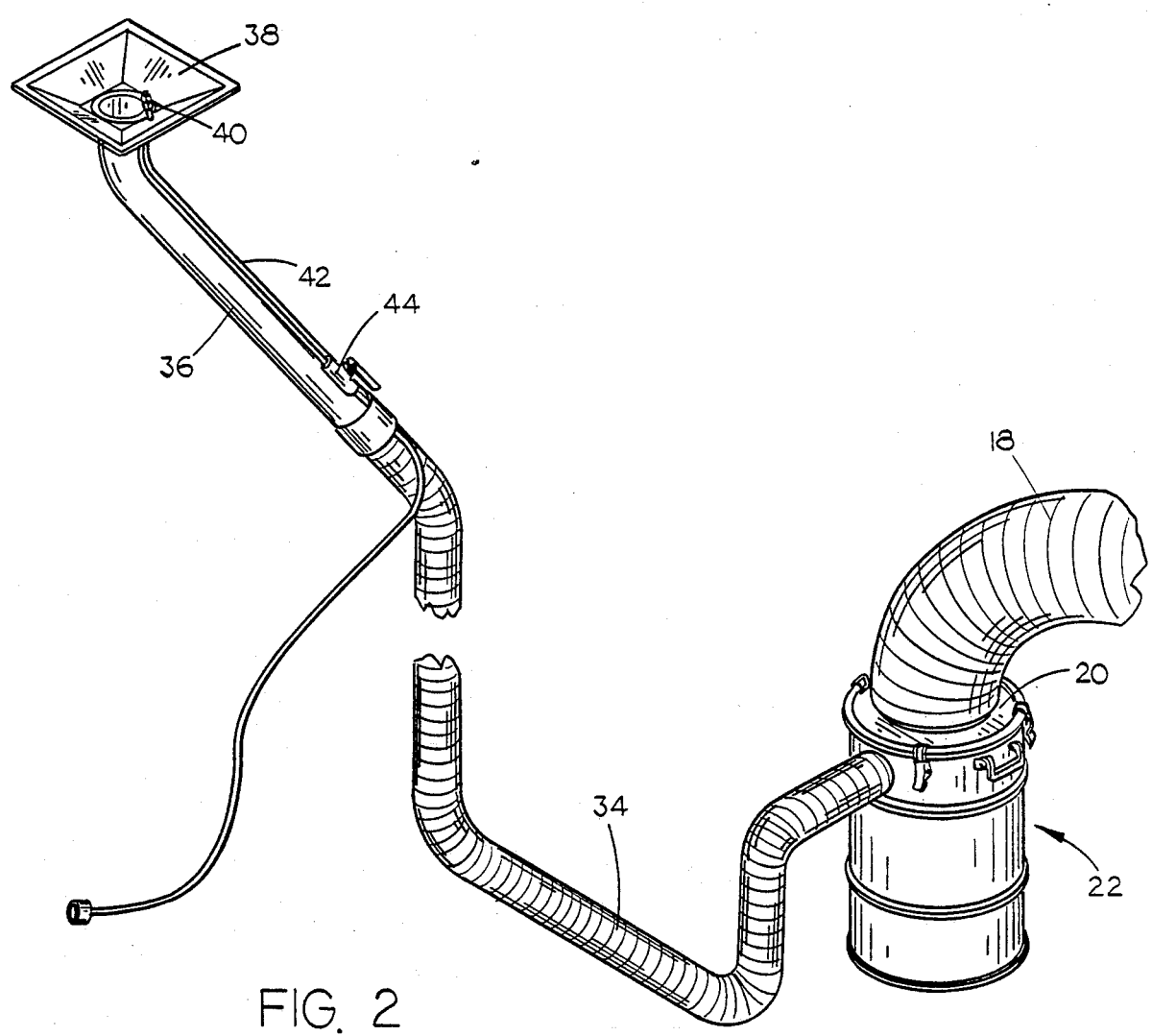
FIG. 2 is a partial perspective view of the apparatus of this invention.

In FIG. 1, the numeral 10 refers generally to a space from which the asbestos or other hazardous material is to be removed. Space 10 is normally defined by the walls of the building structure or by temporary walls when the space is quite large. When it is necessary to erect temporary walls, the asbestos material on the ceiling 12 must either be removed or dampened to facilitate engagement of the upper end of the temporary wall with the ceiling.

The numeral 14 refers to a conventional filtration unit of the negative pressure type such as the Model MT-3 of Micro-Trap, Inc. of Maple Shade, N.J. or the Model ST2000 of Global Consumer Services, Inc. of Los Angeles, Calif. Filtration unit 14 is designed to filter air passing therethrough and to discharge the air from the space 10 through an outlet 16. A flexible conduit 18 extends from the inlet end of the filtration unit 14 to the cover 20 of a trap 22. As seen in the drawings, cover 20 has an air outlet 24 formed therein which is in communication with the interior of conduit 18.

Figure 3:
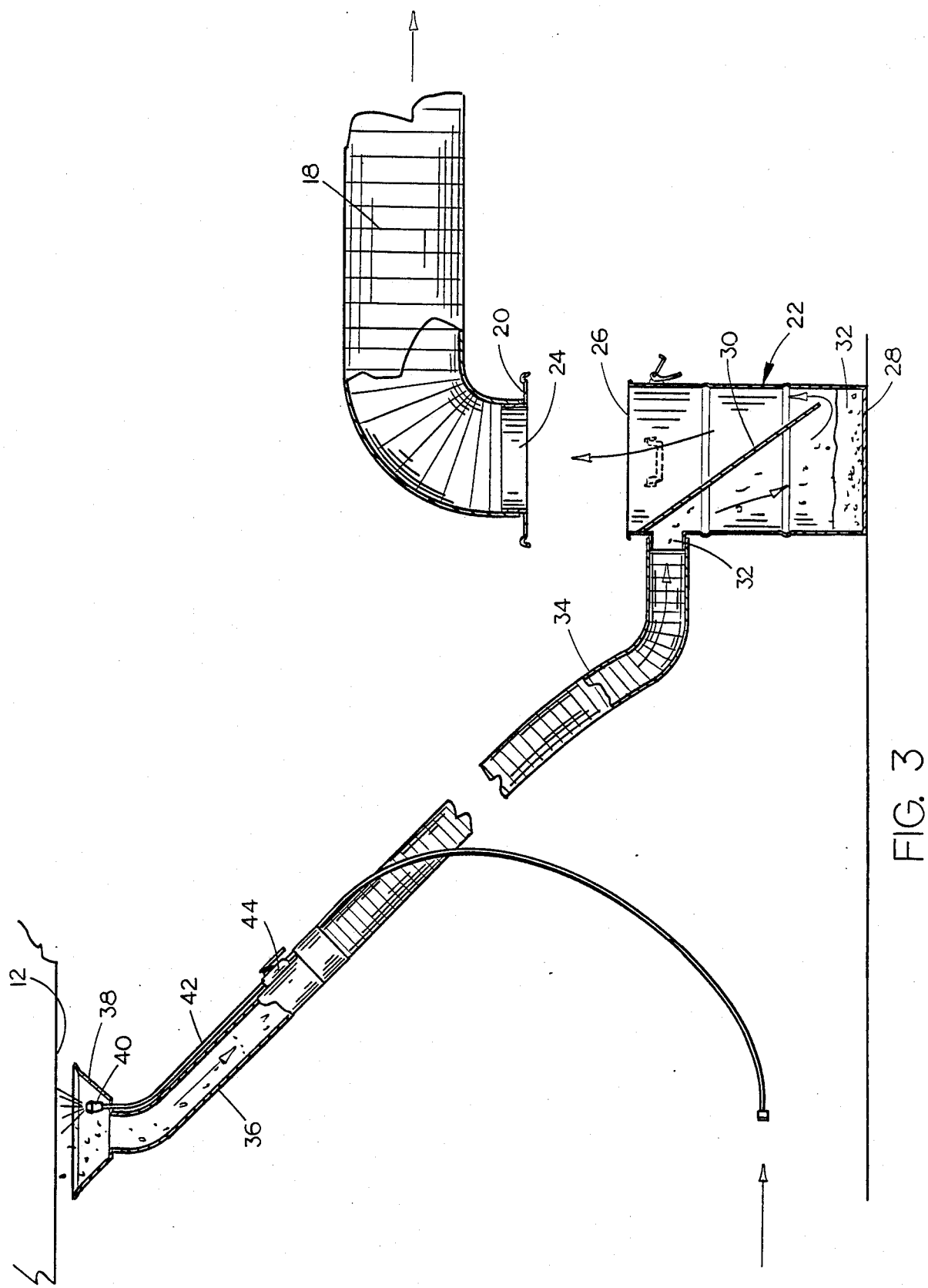
FIG. 3 is a side view similar to FIG. 1 except that portions of the invention have been cut away to more fully illustrate the invention.

Trap 22 is generally cylindrical in shape and has an open upper end 26 and a closed lower end 28. Baffle 30 extends downwardly and laterally from the upper end of trap 22 between the side walls thereof to a location just above the lower end of the trap as seen in FIG. 3. Fluid such as water 32 is placed in the trap 22 below the lower end of baffle 30.

Trap 22 has an intake end 32 formed in the side wall thereof behind baffle 30 as seen in FIG. 3. Flexible conduit 34 is connected to the intake end 32 and extends therefrom. A rigid tube 36 is secured to the other end of conduit 34 and has a collector pan 38 mounted thereon as best seen in FIG. 3. Spray nozzle 40 is positioned within collector pan 38 and has hose 42 extending therefrom which is in operative communication with a source of water or the fluid under pressure. Valve 44 is provided in hose 42 to control the flow of water from the nozzle 40.

When it is desired to dampen the asbestos material to either facilitate the eventual removal of the same or to facilitate the forcing or pressing of the upper end of the temporary wall to engagement therewith, the collector pan 38 is held in position beneath the material to be dampened. Water is discharged from the spray nozzle 40 by controlling the valve 44. Any asbestos material which is loosened or caused to become airborne by the spraying operation will be drawn into the collector pan 38 and thence into the trap 22 since the filtration unit 14 is drawing air through the collector pan 38, tube 42, conduit 34, trap 22 and conduit 18. Any excess water which drips from the ceiling or material being dampened will also drop into the collector pan 38 and will be drawn into the trap 22. As the water and air are drawn into the trap 22, the same impinge upon the baffle 30 which ensures that the water will drop to the bottom of the trap 22 so that the water will not be drawn into the conduit 18. It is extremely important that water not be permitted to enter the filtration unit 14 since damage to the filters could occur if such did happen.

Once the material has been dampened, the material may be removed so that the upper end of the temporary wall engages an asbestos-free surface. The collector pan is positioned adjacent the area of removal so that any asbestos falling from the ceiling during the removal operation will also pass to the trap 22. Further, airborne asbestos fibers will be drawn into the collector pan 38 and delivered to the trap 22.

The apparatus of this invention may also be used to encapsulate the hazardous material as an abatement procedure. When the asbestos material is being encapsulated, the appropriate encapsulating liquid would be delivered to the nozzle 40. As the nozzle 40 sprays the encapsulating material onto the asbestos, any fibers dislodged during the spraying operation will fall into the collector pan 38 for delivery to the trap 22.

The apparatus of this invention also substantially eliminates the hazard normally associated with excess water accumulating on the floor, within the enclosed area, during spraying operations since the excess water is collected by the apparatus.

The system is operated until the material trapped within the trap 22 becomes sludge-like and it is necessary to remove the material from the trap. The sludge-like material is removed by simply moving cover 20 from trap 22 and dumping the trap 22 in a suitable receptacle.

Thus it can be seen that the apparatus of this invention accomplishes at least all of its stated objectives.

I claim:

1. An apparatus for dampening or encapsulating hazardous material in an enclosed contaminated space, comprising:

a filtration means having an air inlet, an air outlet and a filter means therebetween;

means for drawing air into said air inlet, through said filter means, and outwardly through said air outlet;

a collector pan means adapted to be positioned adjacent the material to be dampened or encapsulated;

a first conduit means having opposite ends, one end of said first conduit means being in communication with said collector pan means;

a trap means in said enclosed contaminated space having a inlet end and an outlet end;

the inlet end of said trap means being in communication with the other end of said first conduit means;

a second conduit means having opposite ends, one end of said second conduit being in communication with the outlet end of said trap means, the other end of said second conduit means being in communication with the air inlet of said filtration means;

a spray nozzle means positioned adjacent said collector pan means;

means for supplying fluid to said spray nozzle means whereby fluid may be sprayed onto the hazardous material to dampen or encapsulate the same and whereby excess fluid and any hazardous material which is loosened during the spraying operation will be collected by said collector pan means and supplied to said trap means;

said trap means preventing the fluid from reaching said filtration unit and trapping a portion of the said hazardous material entering said trap means.

2. The apparatus of claim 1 wherein said trap means includes a baffle means positioned between said inlet and outlet ends for preventing the fluid, entering said trap means, from passing to said filtration means.

* * * * *